(12) United States Patent
Chung et al.

(10) Patent No.: US 8,722,008 B2
(45) Date of Patent: May 13, 2014

(54) METHOD FOR UPGRADE-PROCESSING CARBON BLACK PRODUCED BY PERFORMING A PYROLYSIS PROCESS ON WASTE TIRES

(75) Inventors: Soo Hyun Chung, Daejeon (KR); Jeong Geol Na, Daejeon (KR)

(73) Assignee: Korea Institute of Energy Research, Daejeon (KR)

( * ) Notice: Subject to any disclaimer, the term of this patent is extended or adjusted under 35 U.S.C. 154(b) by 0 days.

(21) Appl. No.: 13/515,681

(22) PCT Filed: Dec. 3, 2010

(86) PCT No.: PCT/KR2010/008643
§ 371 (c)(1),
(2), (4) Date: Jun. 13, 2012

(87) PCT Pub. No.: WO2011/074811
PCT Pub. Date: Jun. 23, 2011

(65) Prior Publication Data
US 2012/0263641 A1    Oct. 18, 2012

(30) Foreign Application Priority Data
Dec. 16, 2009   (KR) ........................ 10-2009-0125298

(51) Int. Cl.
*B29B 17/02*   (2006.01)
(52) U.S. Cl.
USPC ..................................... 423/449.7; 423/449.3
(58) Field of Classification Search
USPC .......................................... 423/449.3, 449.7
See application file for complete search history.

(56) References Cited

U.S. PATENT DOCUMENTS 3,978,199 A    8/1976   Maruhnic et al.
6,271,427 B1   8/2001   Ershag

FOREIGN PATENT DOCUMENTS

| JP | 2000-140790 A | 5/2000 |
|---|---|---|
| JP | 2002-523552 A | 7/2002 |
| KR | 20-1997-0049594 U | 8/1997 |
| KR | 10-0214916 B1 | 8/1999 |
| KR | 10-2001-0089169 A | 9/2001 |
| KR | 10-2002-0037532 A | 5/2002 |
| KR | 10-0473763 B1 | 3/2005 |

OTHER PUBLICATIONS

Piskorz et al. "Recovery of Carbon Black from Scrap Rubber". Energy & Fuels 1999, 13, 544-551.*
J. Piskorz et al., "Recovery of Carbon Black from Scrap Rubber", Energy & Fuels, 1999, pp. 544-551, vol. 13.

* cited by examiner

*Primary Examiner* — Stanley Silverman
*Assistant Examiner* — Richard M Rump
(74) *Attorney, Agent, or Firm* — Rabin & Berdo, P.C.

(57) ABSTRACT

Disclosed is a method for upgrade-processing carbon black produced by performing a pyrolysis on waste tires and, more particularly to, a method of upgrading carbon black which includes removing iron wires and fibers from carbon black produced by performing a pyrolysis on waste tires with a magnetic separator and a gravity separator and then subjecting the carbon black to micronization, heating, and acid treatment to upgrade the carbon black. The method for upgrade-processing carbon black produced by performing a pyrolysis on waste tires includes producing an inorganic salt by treating carbon black produced by performing a pyrolysis on waste tires with an acid solution to produce an inorganic salt from an inorganic substance contained in the carbon black.

12 Claims, 2 Drawing Sheets

METHOD FOR UPGRADE-PROCESSING CARBON BLACK PRODUCED BY PERFORMING A PYROLYSIS PROCESS ON WASTE TIRES

TECHNICAL FIELD

The present invention relates to a method for upgrade-processing carbon black produced by performing a pyrolysis on waste tires and, more particularly to, a method of upgrading carbon black which includes removing iron wires and fibers from carbon black produced by performing a pyrolysis on waste tires with a magnetic separator and a gravity separator and then subjecting the carbon black to micronization, heating, and acid treatment to update the carbon black.

BACKGROUND ART

Carbon black, used in the manufacture of tires, is an essential additive to enhance the cohesiveness of the principal ingredient of tires, rubber, and required to have a high purity of 99% or above.

The methods and apparatuses for recovering carbon black from waste tires are disclosed in Korean Utility Model No. 20-1997-0049594 ("Automatic discharging apparatus of carbon black of decomposer of scrap tires"), Korean Patent No. 0473763 ("Automatic sequential emulsification of scrap tires, carbon black, and wire core recycling apparatus", and Korean Patent No. 0214916("Method for preparing carbon black from scrap tires and apparatus for the same").

However, the methods and apparatuses are all required to include a pyrolysis process for recovery of carbon black from waste tires, and the carbon black from the pyrolysis of waste tires is liable to deterioration of purity to about 78 to 82% because of the existence of other additives used in the manufacture of tires.

The reason of such deterioration in the quality of carbon black is the existence of the residual volatile substances introduced during the pyrolysis process and inorganic substances used as additives. The examples of the inorganic additives are sulfur, zinc chloride ($ZnCl_2$), magnesium oxide (MgO), silica ($SiO_2$), calcium carbonate ($CaCO_3$), iron oxide ($Fe_2O_3$), and so forth. Among these inorganic additives, sulfur, in most cases, exists in the form of organic sulfur having a bonding with hydrocarbon, and desulfurization costs too much to carry out. Hence, carbon black is actually hard to be enhanced in quality through desulfurization.

DISCLOSURE OF INVENTION

Technical Problem

It is therefore an object of the present invention to update carbon black recovered from waste tires by eliminating residual volatile substances and inorganic additives through processing of carbon black produced by performing a pyrolysis on waste tires.

Technical Solution

To accomplish the above object, the present invention is to provide a method for upgrade-processing carbon black produced by performing a pyrolysis on waste tires that comprises: producing an inorganic salt by treating carbon black produced by performing a pyrolysis on waste tires with an acid solution to produce an inorganic salt from an inorganic substance in the carbon black.

The method further comprises, prior to producing the inorganic salt, conducting a magnetic separation and a gravity separation on the carbon black produced by performing a pyrolysis on waste tires to remove iron wires and fibers from the carbon black.

The method further comprises: micronizing the carbon black removed of iron wires and fibers; and heating the micronized carbon black to eliminate volatile substances, followed by the production of an inorganic salt.

The method further comprises, after production of an inorganic salt, filtering and washing the carbon black to separate the inorganic salt from the carbon black.

The method further comprises: coagulating the separated inorganic salt with a coagulating agent.

The method further comprises: drying the carbon black filtered and washed.

Further, the acid solution and washing water are separately recovered in filtrating and washing. The recovered acid solution is reused in production of the inorganic substance, and the washing water is reused in washing.

The filtration and washing is repeatedly conducted at least twice.

The acid solution is a diluted hydrochloric acid.

Advantageous Effects

The present invention provides an effect of processing carbon black produced by performing a pyrolysis on waste tires to eliminate residual volatile substances and inorganic additives and thereby to upgrade the carbon black for reuse purpose.

Further, the present invention involves conducting an acid treatment using a hydrochloric acid solution to readily elute inorganic substances from the carbon black and allows a discharge of the inorganic substances in the form of sodium chloride by neutralization with sodium hydroxide (NaOH) during a discharge of waste water, thereby reducing the burden of waste water treatment.

BEST MODE FOR CARRYING OUT THE INVENTION

The present invention will be hereafter described in detail with reference to the accompanying drawings.

The present invention is directed to a technique based on the fact that most of the inorganic substances other than silica among the inorganic additives used in manufacture of tires can be converted to salts capable of being eluted in water through acid treatment.

Figure 1:
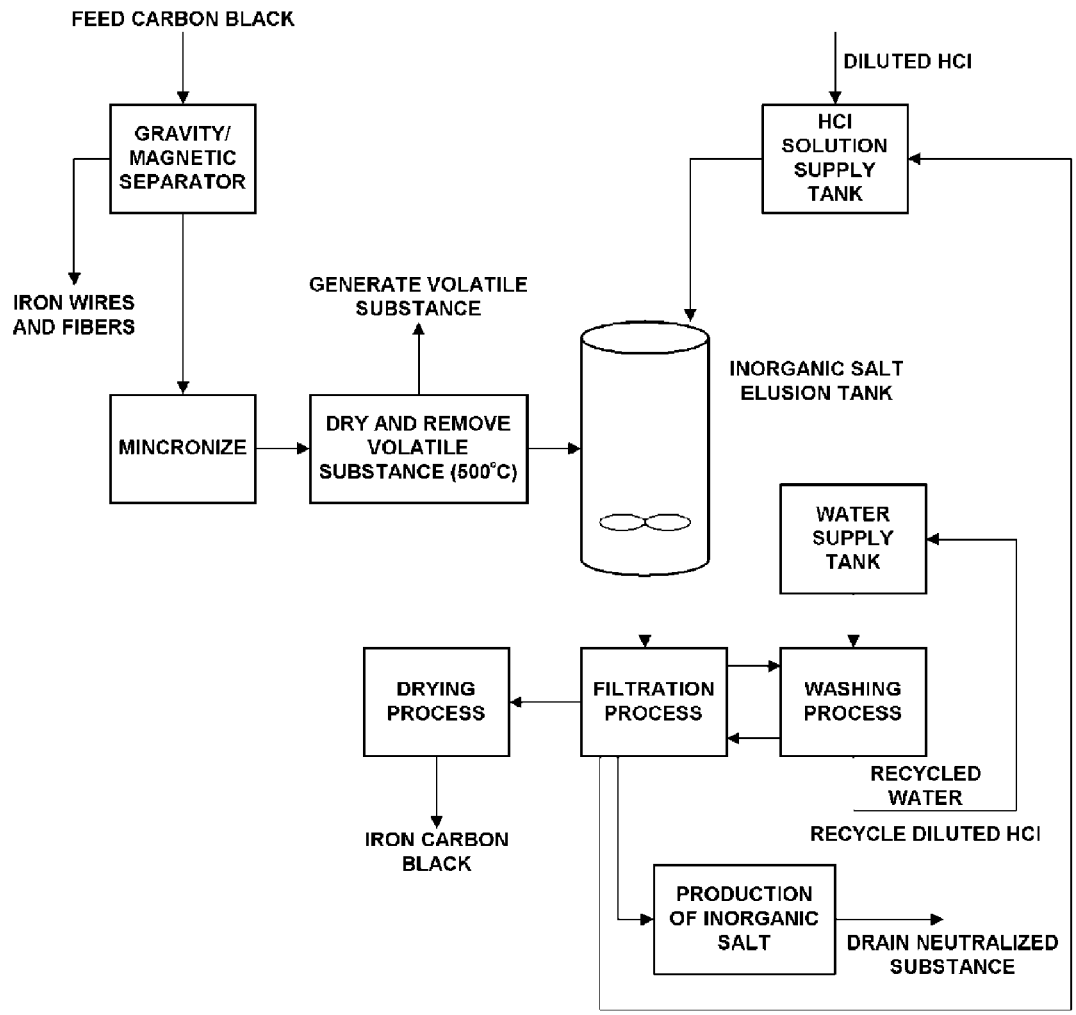
FIG. 1 is a schematic process flow diagram of the present invention.
Figure 2:
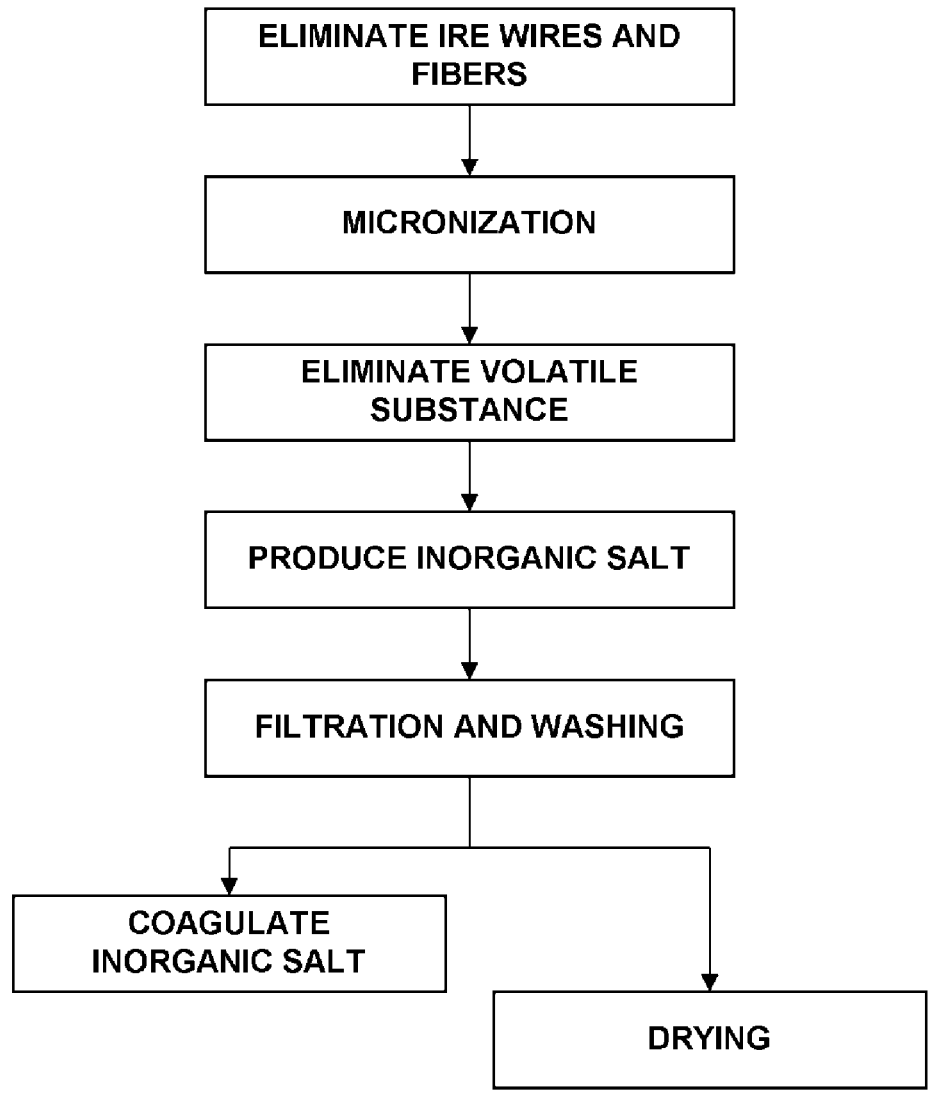
FIG. 2 is a schematic diagram showing the process of the present invention.

FIGS. 1 and 2 are a schematic process flow diagram and a schematic diagram showing the process of the present invention, respectively, which process includes removing iron wires and fibers from carbon black, micronizing the carbon black, eliminating volatile substances, producing inorganic salts, conducting filtration and washing, drying, and coagulating the inorganic salts.

The carbon black produced by performing a pyrolysis on waste tires contains iron wires and fibers (e.g., nylon fibers, etc.) added during the manufacture of tires. The carbon black is subjected to magnetic separation and gravity separation to remove iron wires and fibers produced after pyrolysis of waste tires.

The magnetic separation and gravity separation are conducted with, if not specifically limited to, a magnetic separator and a gravity separator. The removal of iron wires by magnetic separation and fibers by gravity separation are well known to those skilled in the art and will not be described in further detail.

After completion of the magnetic and gravity separations, the carbon black removed of iron wires and fibers is micronized and then heated to eliminate volatile substances. The micronization process is for enhancing the separation efficiency of the carbon black from the inorganic substances contained in the carbon black, and the particle size in the micronization process is not specifically limited. For upgrading, the carbon black is required to be removed of the residual volatile substances produced in the pyrolysis process. For this, the carbon black is heated up to about 500° C. to eliminate volatile substances. Aside from the removal of volatile substances, heating the carbon black can also remove the water absorbed by the carbon black during the storage process, thereby easily upgrading the carbon black through sufficient removal of water. Here, the heating temperature is not specifically limited, but the heating process is terminated when the carbon black sufficiently dries out.

Subsequently, the carbon black removed of the volatile substances is fed into an inorganic salt elusion tank and treated with an acid solution to form inorganic salts from the inorganic substances in the carbon black. Prior to receiving the carbon black removed of the volatile substances, the elusion tank is under agitation while being supplied with the acid solution. Then, the carbon black removed of the volatile substances is introduced into the elusion tank to produce inorganic salts. The agitation time is less than 30 to 60 minutes to keep the agitation causing the reaction.

The acid solution as used herein is a diluted hydrochloric acid. The use of diluted hydrochloric acid helps an easy discharge of inorganic substances from the carbon black with high solubility during formation of the inorganic salts and also allows a discharge of the inorganic substances in the form of sodium chloride by neutralization with sodium hydroxide (NaOH) during a discharge of waste water, thereby relatively reducing the burden of waste water treatment. Further, the inorganic salts produced by using diluted hydrochloric acid as the acid solution are zinc chloride ($ZnCl_2$), magnesium chloride ($MgCl_2$), calcium chloride ($CaCl_2$), or iron chloride ($FeCl_2$), which are high in solubility to water and thus washable with water, enhancing the purity of the carbon black.

The added amount of the acid solution is determined depending on the content of the inorganic salts and preferably in the range of 0.05 to 0.5 N.

The inorganic salts thus formed are filtered and washed to be separated from the carbon black. The filtration and washing process, which is to discharge the inorganic salts eluted in the water, may be preferably conducted at least twice, more preferably 2 to 3 times until almost inorganic salts are completely eluted.

The inorganic salts eluted through the filtration and washing process, which are discharged in the form eluted in water, become coagulated in the presence of a coagulating agent and thus eliminated in the coagulated form. The remaining waste water is neutralized with sodium hydroxide (NaOH) or the like and then drained. The carbon black removed of the inorganic salts is dried out and then collected as a purified carbon black, that is, upgraded carbon black.

In filtration and washing, the acid solution, that is, diluted hydrochloric acid is recovered through filtration and repeatedly reused in the process of producing inorganic salts. When the concentration of hydrochloric acid becomes lower than a predetermined value, more of hydrochloric acid is added to adjust the concentration of hydrochloric acid.

Further, the washing water used in the filtration and washing is also recovered repeatedly reused in the washing process. When the concentration of inorganic salts increases as a consequence of repeatedly using the washing water, a coagulating agent is added to coagulate the inorganic salts and thereby to reduce the cost of the whole process.

Hereinafter, the present invention will be described by way of the following example.

EXAMPLE 20 g of carbon black produced by performing a pyrolysis on waste tires was treated with 100 ml of 0.05 N, 0.1 N, or 0.2 N HCl solution under agitation at the room temperature for 30 minutes.

The acid-treated carbon black was collected and measured in regard to the carbon content and the hydrogen content. The measurement results are presented in Table 1.

TABLE 1

Measurement Results of Carbon and Hydrogen Contents

| Sample | | Carbon Content (%) | Hydrogen Content (%) |
|---|---|---|---|
| Original Sample | | 84.00 | 1.57 |
| Sample Treated with HCl | 0.05N | 85.60 | 1.37 |
| | 0.1N | 86.85 | 1.48 |
| | 0.2N | 87.60 | 1.55 |

As can be seen from Table 1, the elution of inorganic salts with hydrochloric acid was verified by the ascending carbon content of the HCl-treated samples. The carbon content increased with an increase in the concentration of HCl. The carbon content was most increased by 3.6% when the sample was treated with 0.2 N HCl.

While the present invention has been described with reference to the particular embodiment above, it is to be appreciated that those skilled in the art can change or modify the embodiment without departing from the scope and spirit of the present invention.

What is claimed is:

1. A method for upgrade-processing carbon black produced by performing a pyrolysis on waste tires, comprising:
    performing the pyrolysis on the waste tires so as to produce the carbon black from the waste tires;
    producing an inorganic salt by treating the carbon black with an acid solution to produce the inorganic salt from an inorganic substance in the carbon black;
    after said producing an inorganic salt, filtering and washing the carbon black to separate the inorganic salt from the carbon black; and
    coagulating the separated inorganic salt with a coagulating agent.

2. The method as claimed in claim 1, further comprising:
    prior to said producing an inorganic salt, conducting a magnetic separation and a gravity separation on the carbon black to eliminate iron wires from the carbon black and fibers from the carbon black.

3. The method as claimed in claim 2, further comprising:
after said conducting a magnetic separation and a gravity separation, micronizing the carbon black that has been removed of the iron wires and the fibers; and
prior to said producing an inorganic salt, heating the micronized carbon black to eliminate volatile substances.

4. The method as claimed in claim 1, further comprising:
drying the filtered and washed carbon black.

5. The method as claimed in claim 1, wherein in said filtering and washing, washing water separates the inorganic salt from the carbon black, the acid solution and the washing water are separately recovered in the filtering and washing, wherein the acid solution is reused to produce inorganic salt, the washing water being reused in the filtering and washing.

6. The method as claimed in claim 1, wherein the filtering and washing is repeatedly conducted at least twice.

7. The method as claimed in claim 1, wherein the acid solution is a diluted hydrochloric acid.

8. The method as claimed in claim 2, wherein the acid solution is a diluted hydrochloric acid.

9. The method as claimed in claim 3, wherein the acid solution is a diluted hydrochloric acid.

10. The method as claimed in claim 4, wherein the acid solution is a diluted hydrochloric acid.

11. The method as claimed in claim 5, wherein the acid solution is a diluted hydrochloric acid.

12. The method as claimed in claim 6, wherein the acid solution is a diluted hydrochloric acid.

\* \* \* \* \*